(12) United States Patent
Sawakami

(10) Patent No.: US 11,161,373 B2
(45) Date of Patent: Nov. 2, 2021

(54) TIRE

(71) Applicant: Sumitomo Rubber Industries, Ltd., Kobe (JP)

(72) Inventor: Isao Sawakami, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 354 days.

(21) Appl. No.: 15/810,873

(22) Filed: Nov. 13, 2017

(65) Prior Publication Data

US 2018/0134088 A1    May 17, 2018

(30) Foreign Application Priority Data

Nov. 14, 2016    (JP) .............................. JP2016-221787

(51) Int. Cl.
    *B60C 11/03*    (2006.01)
    *B60C 11/12*    (2006.01)
    *B60C 11/13*    (2006.01)

(52) U.S. Cl.
    CPC ...... *B60C 11/0302* (2013.01); *B60C 11/0304* (2013.01); *B60C 11/0306* (2013.01);
    (Continued)

(58) Field of Classification Search
    CPC ............ B60C 11/0302; B60C 11/1204; B60C 11/125; B60C 11/0306; B60C 11/0304;
    (Continued)

(56) References Cited

U.S. PATENT DOCUMENTS

2012/0132334 A1    5/2012    Nomura
2012/0285592 A1    11/2012    Kameda
(Continued)

FOREIGN PATENT DOCUMENTS

CN    203902168 U  *  10/2014  ............ B60C 11/12
EP    3213931 A1    6/2012
(Continued)

OTHER PUBLICATIONS

English Translation of JP 2000168317 (Year: 2000).*
(Continued)

*Primary Examiner* — Timothy Kennedy
*Assistant Examiner* — Olukorede Esan
(74) *Attorney, Agent, or Firm* — Birch, Stewart, Kolasch & Birch, LLP

(57) ABSTRACT

A tire includes a tread portion with a designated install direction to a vehicle to have an inboard tread edge and an outboard tread edge. The tread portion is provided with a circumferentially extending inboard shoulder main groove to form an inboard shoulder land portion and a circumferentially extending outboard shoulder main groove with a width smaller than a width of the inboard shoulder main groove to form an outboard shoulder land portion. The inboard shoulder land portion is provided with inboard shoulder lug grooves extending inwardly in a tire axial direction from at least the inboard tread edge and terminated within the inboard shoulder land portion. The outboard shoulder land portion is provided with outboard shoulder lug grooves extending inwardly in the tire axial direction from at least the outboard tread edge to the outboard shoulder main groove.

14 Claims, 8 Drawing Sheets

(52) U.S. Cl.
CPC ........ B60C 11/1204 (2013.01); B60C 11/125 (2013.01); B60C 11/13 (2013.01); *B60C 2011/036* (2013.01); *B60C 2011/0344* (2013.01); *B60C 2011/0353* (2013.01); *B60C 2011/0358* (2013.01); *B60C 2011/0369* (2013.01); *B60C 2011/0381* (2013.01); *B60C 2011/0383* (2013.01)

(58) Field of Classification Search
CPC ............. B60C 11/13; B60C 2011/0381; B60C 2011/0344; B60C 2011/0383; B60C 2011/0358; B60C 2011/0353; B60C 2011/036
See application file for complete search history.

(56) References Cited

U.S. PATENT DOCUMENTS

| | | | | |
|---|---|---|---|---|
| 2012/0298269 A1* | 11/2012 | Mathonet | ............ | B60C 11/0306 152/209.16 |
| 2013/0167994 A1* | 7/2013 | Hada | ................... | B60C 11/1369 152/209.8 |
| 2013/0186532 A1* | 7/2013 | Kujime | ............... | B60C 11/0304 152/209.8 |
| 2014/0130952 A1* | 5/2014 | Tanaka | ................ | B60C 11/0306 152/209.24 |
| 2014/0230982 A1* | 8/2014 | Ninomiya | ............ | B60C 11/0306 152/209.22 |
| 2014/0283967 A1* | 9/2014 | Inoue | ...................... | B60C 11/12 152/209.18 |
| 2015/0075686 A1* | 3/2015 | Suga | ................... | B60C 11/1392 152/209.16 |
| 2015/0210121 A1* | 7/2015 | Sanae | ................. | B60C 11/0304 152/209.8 |
| 2015/0231929 A1* | 8/2015 | Nagahara | ............... | B60C 11/042 152/209.8 |
| 2016/0137006 A1* | 5/2016 | Yamamoto | ............ | B60C 11/125 152/209.24 |

FOREIGN PATENT DOCUMENTS

| | | | | |
|---|---|---|---|---|
| EP | 2610082 A2 | | 7/2013 | |
| EP | 2829421 A1 | | 1/2015 | |
| JP | 2000168317 A | * | 6/2000 | ......... B60C 11/0306 |
| JP | 2015-140047 A | | 8/2015 | |
| KR | 10-2012-0059392 A | | 6/2012 | |

OTHER PUBLICATIONS

English Translation of CN 203902168U (Year: 2014).*
Extended European Search Report, dated Mar. 16, 2018, for European Application No. 17200579.5.

* cited by examiner

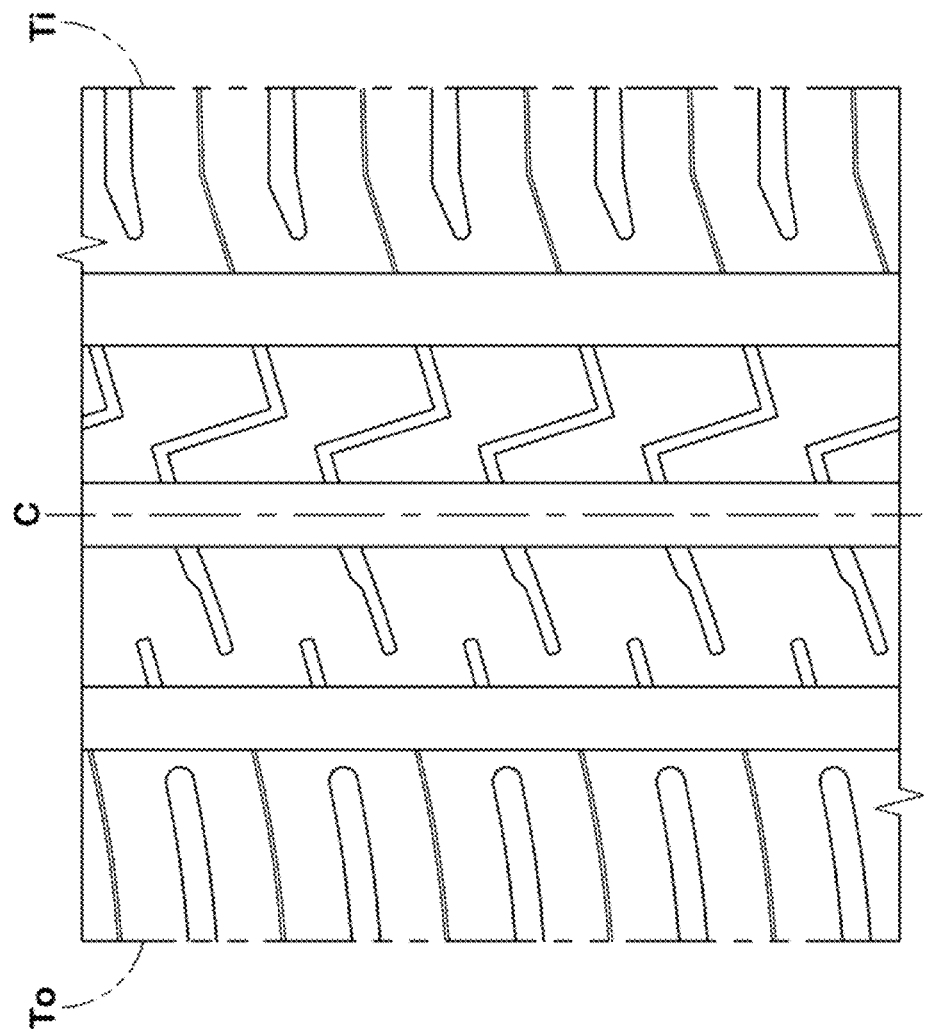

TIRE

BACKGROUND ART

Field of the Invention

The present disclosure relates to tires, and more particularly to a tire that may deliver excellent steering stability and wet performance.

Description of the Related Art

Japanese Unexamined Patent Application Publication No. 2015-140047 discloses a tire tread with a designated install direction to a vehicle, including an inboard shoulder main groove and an outboard shoulder main groove having a smaller width than that of the inboard shoulder main groove. Further, the tire tread disclosed in the above patent publication includes lateral grooves that extend completely across the inboard shoulder land portion and lug grooves that extend on the outboard shoulder land portion having ends terminated within the land portion.

Unfortunately, in the tire tread disclosed in the above patent publication, there has been room for further improvement on steering stability and wet performance.

SUMMARY OF THE INVENTION

In view of the above problems in the conventional art, the present disclosure has an object to provide a tire which may deliver excellent steering stability and wet performance.

In one aspect of the disclosure, a tire includes a tread portion having a designated install direction to a vehicle so as to have an inboard tread edge which is intended to be positioned toward the center of a vehicle body of a vehicle when the tire is installed to the vehicle and an outboard tread edge which is intended to be positioned away from the center of the vehicle body when the tire is installed to the vehicle. The tread portion is provided with an inboard shoulder main groove extending continuously in a tire circumferential direction on the side of the inboard tread edge to form an inboard shoulder land portion between the inboard tread edge and the inboard shoulder main groove, and an outboard shoulder main groove extending continuously in the tire circumferential direction on the side of the outboard tread edge with a width smaller than a width of the inboard shoulder main groove to form an outboard shoulder land portion between the outboard tread edge and the outboard shoulder main groove. The inboard shoulder land portion is provided with a plurality of inboard shoulder lug grooves each extending inwardly in a tire axial direction from at least the inboard tread edge and terminated within the inboard shoulder land portion. The outboard shoulder land portion is provided with a plurality of outboard shoulder lug grooves each extending inwardly in the tire axial direction from at least the outboard tread edge to the outboard shoulder main groove.

In another aspect of the disclosure, each of the plurality of outboard shoulder lug grooves may include a shallow bottom portion on an inner end portion thereof in the tire axial direction.

In another aspect of the disclosure, the tread portion may further be provided with a crown main groove extending continuously in the tire circumferential direction between the inboard shoulder main groove and the outboard shoulder main groove, and the crown main groove may have a width smaller than the width of the inboard shoulder main groove and larger than the width of the outboard shoulder main groove.

In another aspect of the disclosure, the tread portion may further include an outboard middle land portion between the outboard shoulder main groove and the crown main groove, the outboard middle land portion may be provided with a plurality of first middle narrow grooves extending from the crown main groove and terminated within the outboard middle land portion and a plurality of second middle narrow grooves extending from the outboard shoulder main groove and terminated within the outboard middle land portion, and the lengths in the tire axial direction of the plurality of second middle narrow grooves may be shorter than the lengths in the tire axial direction of the plurality of first middle narrow grooves.

In another aspect of the disclosure, the plurality of second middle narrow grooves may extend so as to be continuous smoothly to the plurality of outboard shoulder lug grooves through the outboard shoulder main groove.

In another aspect of the disclosure, the tread portion may further include an inboard middle land portion between the inboard shoulder main groove and the crown main groove, and the inboard middle land portion may be provided with a plurality of inboard middle narrow grooves extending completely across the inboard middle land portion.

In another aspect of the disclosure, each of the plurality of inboard middle narrow grooves may include a first portion extending from the inboard shoulder main groove and inclined in a first direction with respect to the tire axial direction, a second portion extending from the crown main groove and inclined in the first direction with respect to the tire axial direction and a third portion arranged between the first portion and the second portion and inclined in a second direction which is opposite to the first direction with respect to the tire axial direction.

In another aspect of the disclosure, each of the first portion and the second portion may include a broader-width portion formed on the side of a ground contact surface of the inboard middle land portion and a sipe portion having a width narrower than that of the broader-width portion and extending inwardly in a tire radial direction from a bottom of the broader-width portion.

In another aspect of the disclosure, the sipe portions of the first portion and the sipe portion of the second portion may be terminated so as not communication with each other in the third portion.

In another aspect of the disclosure, the third portion may have a maximum depth which is same as a maximum depth of the broader-width portion of the first portion and a maximum depth of the broader-width portion of the second portion.

In another aspect of the disclosure, the length in the tire axial direction of the second portion may be shorter than the length in the tire axial direction of the first portion.

In another aspect of the disclosure, the second portion may extend so as to be continuous smoothly to one of the plurality of first middle narrow grooves through the crown main groove.

BRIEF DESCRIPTION OF THE DRAWINGS

FIG. 8 is a development view of a tread portion of a reference example tire.

DESCRIPTION OF THE PREFERRED EMBODIMENTS

An embodiment of the present disclosure will be explained below with reference to the accompanying drawings.

Figure 1:
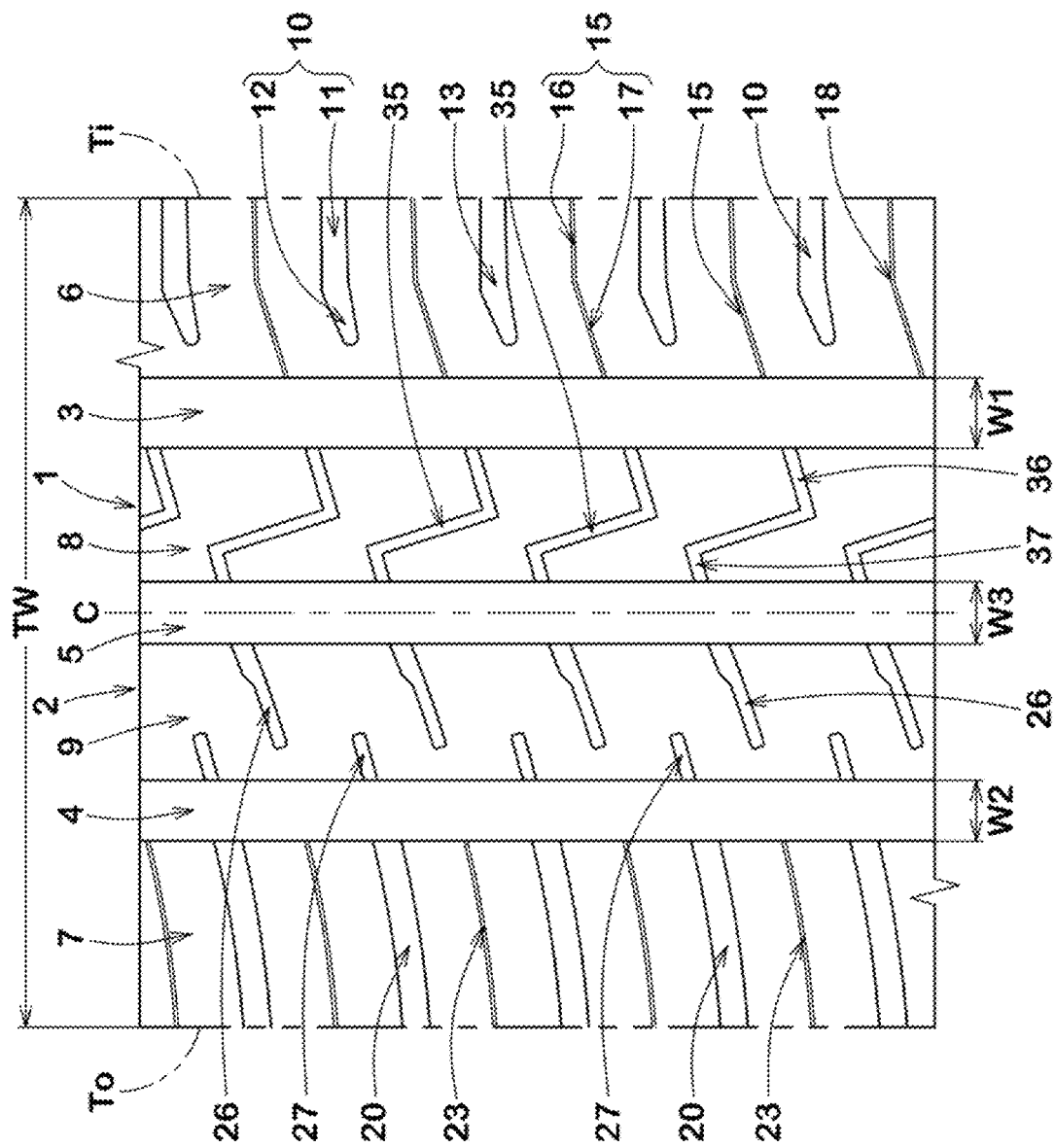
FIG. 1 is a development view of a tread portion of a tire according to an embodiment of the present disclosure.

FIG. 1 illustrates a development view of a tread portion 2 of a tire 1 according to an embodiment of the present disclosure. In some preferred embodiments, the tire 1 may be embodied as various kinds of tires, e.g., pneumatic tires for passenger car, heavy-duty vehicle and the like as well as airless tires capable of structurally supporting the weight of a vehicle without being filled with a pressurized air therein.

As illustrated in FIG. 1, the tire 1 includes the tread portion 2 having a designated install direction to a vehicle. The tread portion 2 includes an inboard tread edge (Ti) which is intended to be positioned toward the center of a vehicle body of a vehicle when the tire is installed to the vehicle and an outboard tread edge (To) which is intended to be positioned away from the center of the vehicle body when the tire is installed to the vehicle. The designated install direction to a vehicle, for example, may be indicated on a sidewall portion (not illustrated) using a mark or characters.

As used herein, the tread edges (To) and (Ti) are the axial outermost edges of the ground contacting patch which occurs under a condition where the tire being under a standard condition is grounded on a plane with a standard tire load at the camber angle of zero degrees.

As used herein, the standard condition is such that the tire is mounted on a standard wheel rim with a standard pressure, but is loaded with no tire load. In this application including specification and claims, various dimensions, positions and the like of the tire refer to those under the standard condition of the tire unless otherwise noted.

As used herein, the standard wheel rim is a wheel rim officially approved for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved for the tire by standards organizations, wherein the standard tire load is the "maximum load capacity" in JATMA, the "Load Capacity" in ETRTO, and the maximum value given in the above-mentioned table in TRA or the like, for example.

The tread portion 2, for example, is provided with an inboard shoulder main groove 3, an outboard shoulder main groove 4 and a crown main groove 5.

The inboard shoulder main groove 3 extends continuously in the tire circumferential direction on the side of the inboard tread edge (Ti). The inboard shoulder main groove 3 is located nearest to the inboard tread edge (Ti) among the main grooves 3 to 5 provided on the tread portion 2. In some preferred embodiments, a distance from the tire equator C to the centerline of the inboard shoulder main groove 3 in the tire axial direction, for example, may be in a range of from 0.20 to 0.30 times the tread width TW. As used herein, the tread width TW is the width measured under the standard condition, as the axial distance between the outboard tread edges (To) and the inboard tread edge (Ti).

The outboard shoulder main groove 4 extends continuously in the tire circumferential direction on the side of the outboard tread edge (To). The outboard shoulder main groove 3 is located nearest to the outboard tread edge (To) among the main grooves 3 to 5 provided on the tread portion 2. In some preferred embodiments, a distance from the tire equator C to the centerline of the outboard shoulder main groove 4 in the tire axial direction, for example, may be in a range of from 0.20 to 0.30 times the tread width TW.

The crown main groove 5, for example, is arranged between the inboard shoulder main groove 3 and the outboard shoulder main groove 4. In this embodiment, one crown main groove 5 is located on the tire equator C. Note that the crown main groove is not limited to the above aspect, but can be provided on both sides of the tire equator C so as to form a center land portion on the tire equator C, for example.

The outboard shoulder main groove 4 has a width W2 smaller than a width W1 of the inboard shoulder main groove 3.

In general, since a relative large ground contact pressure acts on the side of the inboard tread edge (Ti) of the tread portion 2 upon traveling, a circumferential contact length of the inboard shoulder main groove 3, in the tread contact patch, tends to be longer than that of the outboard shoulder main groove 4. Thus, the inboard shoulder main groove 3 is supposed to be more important than the outboard shoulder main groove 4 with respect to a contribution to drainage performance. In view of the above, since the tire 1 in accordance with the present embodiment is configured such that the inboard shoulder main groove 3 has a relatively wider width W1 than the width W2 of the outboard shoulder main groove 4, better drainage performance can be offered by the inboard shoulder main groove 3.

On the other hand, for the tires having a designated install direction to a vehicle, a ground contact pressure acting on the land portion formed between the tire equator C and the outboard tread edge (To) tends to become large when the vehicle begins to turn from straight traveling to cornering. Thus, since the tire in accordance with the present embodiment is configured such that the outboard shoulder main groove 4 has a relatively narrower width W2, a land portion around the groove 4 as well as the above land portion may be increased in rigidity, and therefore offering excellent steering stability.

In order to improve wet performance and steering stability in a good balance, the width W2 of the outboard shoulder main groove 4, for example, may preferably be in a range of from 0.80 to 0.95 times the width W1 of the inboard shoulder main groove 3.

In some preferred embodiments, the crown main groove 5 has a width W3 smaller than the width W1 of the inboard shoulder main groove 3 and larger than the width W2 of the outboard shoulder main groove 4. That is, in this embodiment, the respective widths of the main grooves 3 to 5 on the tread portion 2 vary in such a manner that the nearer the outboard tread edge (To), the narrower the widths are. Thus, drainage performance around the tire equator C and rigidity of the tread portion 2 can be improved in a good balance, leading to excellent steering stability and wet performance.

In some preferred embodiments, the widths W1, W2 and W3 of the inboard shoulder main groove 3, the outboard shoulder main groove 4 and the crown main groove 5 respectively, for example, may be set in a range of from 5.0% to 10.0% of the tread width TW. Further, the depths of the respective main grooves 3 to 5, for example, are of from 5 to 10 mm.

In some preferred embodiments, a total width of the widths W1, W2 and W3 of the inboard shoulder main groove 3, the outboard shoulder main groove 4 and the crown main groove 5 respectively may be set in a range of from 22% to 25% of the tread width TW.

The tread portion 2 is sectioned into an inboard shoulder land portion 6, an outboard shoulder land portion 7, an inboard middle land portion 8 and an outboard middle land portion 9 by the main grooves 3 to 5.

Figure 2:
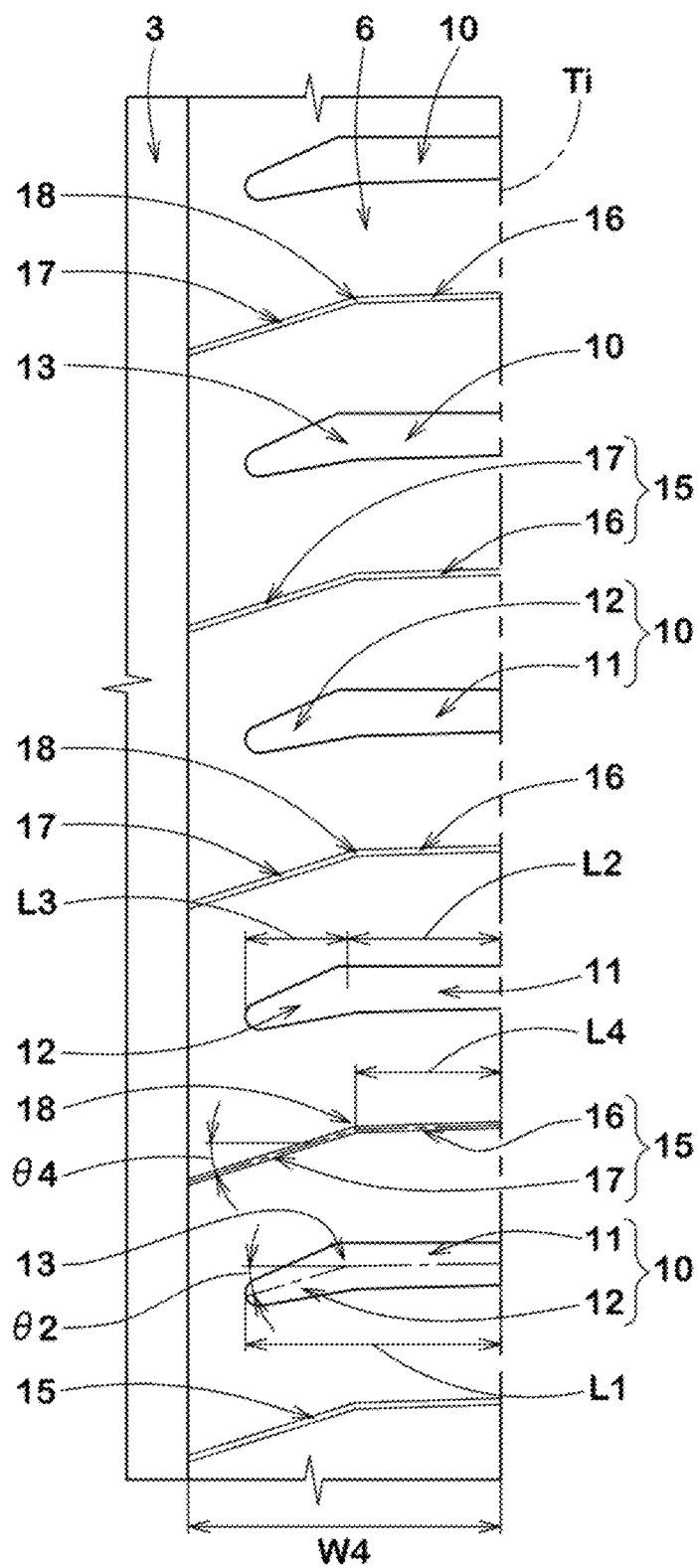
FIG. 2 is an enlarged view of an inboard shoulder land portion illustrated in FIG. 1.

FIG. 2 illustrates an enlarged view of the inboard shoulder land portion 6. As illustrated in FIG. 2, the inboard shoulder land portion 6 is disposed between the inboard tread edge (Ti) and the inboard shoulder main groove 3. The inboard shoulder land portion 6, for example, may have a width W4 in the tire axial direction in a range of from 0.15 to 0.25 times the tread width TW (which is illustrated in FIG. 1, the same hereinafter).

The inboard shoulder land portion 6 is provided with a plurality of inboard shoulder lug grooves 10 which extends inwardly in the tire axial direction from at least the inboard tread edge (Ti) and is terminated within the inboard shoulder land portion 6. Since the tire 1 in this embodiment can offer sufficient drainage performance on the side of the inboard tread edge (Ti) due to relatively wider inboard shoulder main groove 3, the inboard shoulder lug grooves 10 are terminated within the inboard shoulder land portion 6. This aspect may further improve steering stability while maintaining wet performance approximately same as an aspect where the lateral grooves are completely across the inboard shoulder land portion 6.

In this embodiment, the regions between the inboard shoulder lug grooves 10 and each of the inboard shoulder main groove 3 is not provided with any other sipes, i.e., the inboard shoulder lug grooves 10 are not in communication with the inboard shoulder main groove 3 directly or indirectly. Thus, the region of the inboard shoulder land portion 6 may be increased in rigidity, leading to better steering stability.

In some preferred embodiments, the inboard shoulder lug grooves 10, for example, may include first groove portions 11 extending at angles θ1 (not illustrated) within 5 degrees with respect to the tire axial direction and second groove portions 12 connected to the first groove portions 11, wherein the second groove portions 12 extend in different angles to the first groove portions 11 such that bent portions 13 are formed between the first groove portions 11 and the second groove portions 12. Preferably, the angles θ2 of the second groove portions 12, for example, may be in a range of from 10 to 20 degrees with respect to the tire axial direction. In some preferred embodiments, the respective centerlines of the first groove portions 11 and the second groove portions 12 may extend in a straight manner so that the inboard shoulder lug grooves 10 may drain the water toward the inboard tread edge (Ti) effectively.

In some preferred embodiments, the second groove portions 12 may include a pair of straight groove edges to taper extend inwardly in the tire axial direction with an inclination in such a way that the width thereof decreases gradually. The second groove portions 12 as such may prevent uneven wear from occurring on inner ends of the inboard shoulder lug grooves 10.

The inboard shoulder lug grooves 10 preferably have lengths L1 in the tire axial direction in a range of from 0.75 to 0.85 times the width W4 of the inboard shoulder land portion 6, for example. The first groove portions 11 preferably have lengths L2 in the tire axial direction in a range of from 0.50 to 0.60 times the width W4 of the inboard shoulder land portion 6, for example. The second groove portions 12 preferably have lengths L3 in the tire axial direction in a range of from 0.25 to 0.35 times the width W4 of the inboard shoulder land portion 6, for example. The inboard shoulder lug grooves 10 as such may be useful to improve steering stability and wet performance in a good balance.

In some preferred embodiments, the inboard shoulder land portion 6 is provided with a plurality of inboard shoulder sipes 15 which extends completely across the land portion 6 in the tire axial direction. As used herein, a "sipe" means a narrow cut with a width equal to or less than 1.5 mm and which is distinguished from grooves for drainage. In some preferred embodiments, the inboard shoulder lug grooves 10 and the inboard shoulder sipes 15 are arranged alternately in the tire circumferential direction.

The inboard shoulder sipes 15 may include first sipe portions 16 extending at angles θ3 (not illustrated) equal to or less than 5 degrees with respect to the tire axial direction on the side of the inboard tread edge (Ti) and second sipe portions 17 connected to the first sipe portions 16 at different angles with respect to the first sipe portions 16 in such a way as to form bent portions 18 therebetween.

The second sipe portions 17 may preferably have the angles θ4 of from 15 to 25 degrees with respect to the tire axial direction, for example. In some preferred embodiments, the respective first sipe portions 16 and second sipe portions 17 extend in a straight manner.

In some preferred embodiments, distances L4 from the inboard tread edge (Ti) to the respective bent portions 18 in the tire axial direction may preferably be in a range of from 0.40 to 0.50 times the width W4 of the inboard shoulder land portion 6, for example. This aspect may be useful to improve the inboard shoulder land portion 6 in rigidity balance, leading to a preferable ground contact shape.

Figure 3:
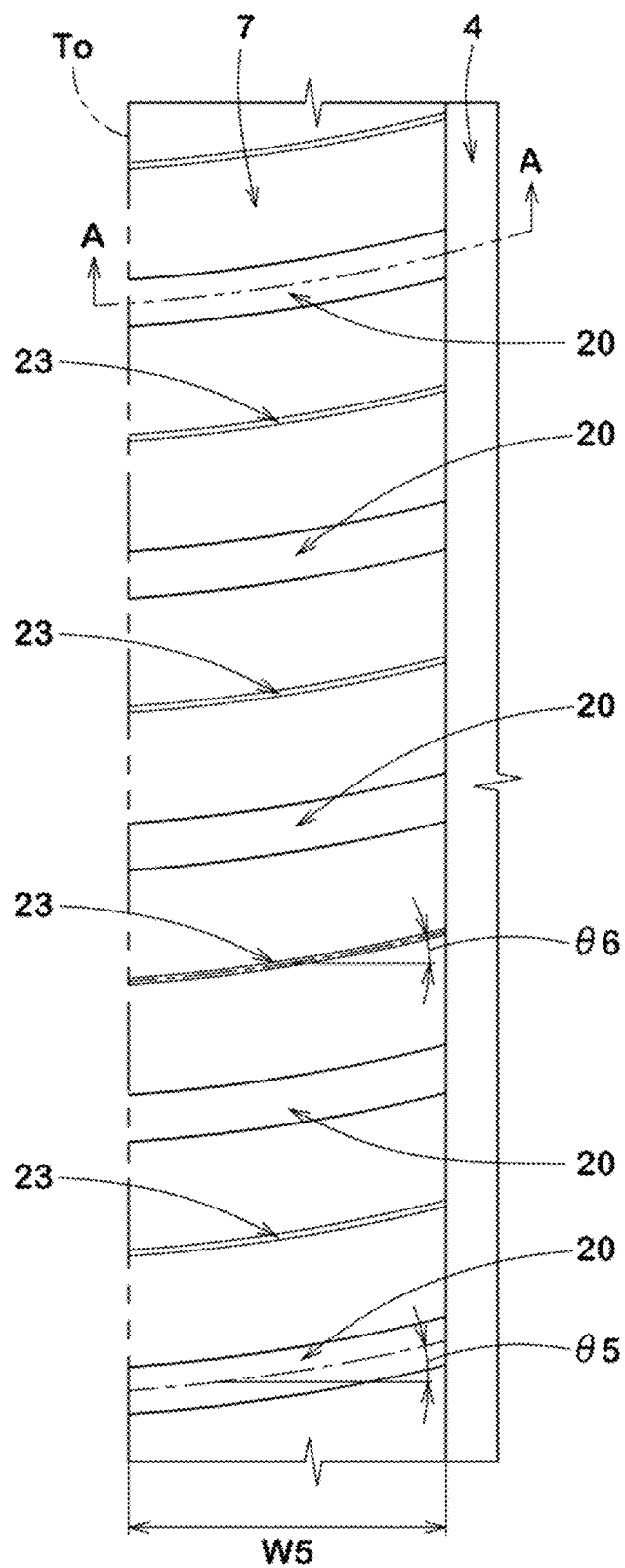
FIG. 3 is an enlarged view of an outboard shoulder land portion illustrated in FIG. 1.

FIG. 3 illustrates an enlarged view of the outboard shoulder land portion 7. As illustrated in FIG. 3, the outboard shoulder land portion 7 is disposed between the outboard tread edge (To) and the outboard shoulder main groove 4. The outboard shoulder land portion 7 may have a width W5 in the tire axial direction in a range of from 0.15 to 0.25 times the tread width TW, for example.

The outboard shoulder land portion 7 is provided with a plurality of outboard shoulder lug grooves 20 which extends from at least the outboard tread edge (To) to the outboard shoulder main groove 4. That is, the outboard shoulder lug grooves 20 extend completely across the outboard shoulder land portion 7 so as to be in communication with the outboard shoulder main groove 4.

The inventor, through various experiments, has found that reduction of steering stability can be suppressed by maintaining rigidity in the tire axial direction of the land portion on the side of the outboard tread edge (To) in the above arrangement of the main grooves 3 to 5 (as illustrated in FIG. 1). Thus, in this embodiment, the outboard shoulder land portion 7 is provided with the outboard shoulder lug grooves 20 extending from the outboard tread edge (To) to the outboard shoulder main groove 4 which are supposed to have little influence on reduction of the axial rigidity of the land portion. The rigidity in the tire axial direction of the outboard shoulder land portion 7 with the outboard shoulder lug grooves 20 can be maintained substantially same level as one with lug grooves terminated within the outboard shoulder land portion 7. Furthermore, the outboard shoulder lug grooves 20 as such may make up for a reduction of drainage property of the outboard shoulder main groove 4 with a relatively narrow width since the outboard shoulder lug grooves 20, on driving wet condition, can drain the water in the outboard shoulder main groove 4 toward the outboard tread edge (To).

The outboard shoulder lug grooves 20 may preferably extend in a smooth curve manner such that the angles θ5 with respect to the tire axial direction increase gradually inwardly in the tire axial direction. The outboard shoulder lug grooves 20 as such, when driving on wet condition, can drain the water therein toward the outboard tread edge (To) smoothly, leading to better wet performance.

Figure 4:
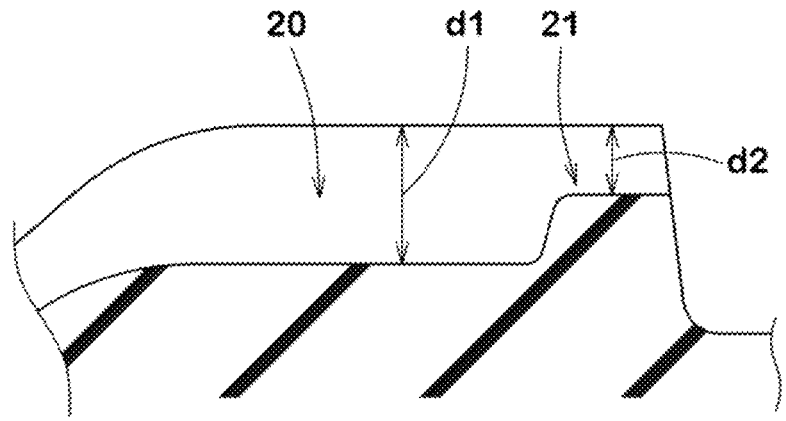
FIG. 4 is a cross-sectional view taken along the line A-A of FIG. 3.

FIG. 4 illustrates a cross-sectional view of one of the outboard shoulder lug grooves 20 taken along the line A-A of FIG. 3. As illustrated in FIG. 4, at least one, preferably each of the outboard shoulder lug grooves 20 may include a shallow bottom portion 21 on an inner end portion thereof in the tire axial direction. In some preferred embodiments, the shallow bottom portion 21 has a top surface in a flat manner that extends along the ground contact surface of the tread portion 2. The depth d2 of the shallow portion 21, for example, may be preferably in a range of from 0.50 to 0.60 times the maximum depth d1 of the outboard shoulder lug groove 20. The outboard shoulder lug grooves 20 as such may increase the inner end portion of the outboard shoulder land portion 7 in rigidity, leading to better steering stability.

As illustrated in FIG. 3, the outboard shoulder land portion 7 may further be provided with a plurality of outboard shoulder sipes 23 which extends completely across the land portion 7 in the tire axial direction. In this embodiment, the outboard shoulder lug grooves 20 and the outboard shoulder sipes 23 are arranged alternately in the tire circumferential direction.

In some preferred embodiments, the outboard shoulder sipes 23, for example, may extend in a smooth curve manner such that the angles θ6 with respect to the tire axial direction increase gradually inwardly in the tire axial direction. In this embodiment, the outboard shoulder sipes 23 extend along (e.g., in parallel with) the outboard shoulder lug grooves 20. The outboard shoulder sipes 23 as such may optimize the ground contact shape of the land portion 7, and thus may suppress uneven wear on the outboard shoulder land portion 7.

As illustrated in FIG. 1, the outboard shoulder lug grooves 20 and the outboard shoulder sipes 23 extend in a curve manner in contrast to the inboard shoulder lug grooves 10 and the inboard shoulder sipes 15 which respectively include the bent portions 13 and the bent portions 18 each of which is formed by substantially straight elements. This combination of the grooves and sipes can be useful to reduce road noise by generating different frequency impact noises of the respective shoulder land portions 6 and 7 when coming into contact with the ground.

In order to further improve the above effect, as a preferred embodiment, the bent portions 13 of the inboard shoulder lug grooves 10 and the bent portions 18 of the inboard shoulder sipes 15 bend so as to protrude to one of the directions in the tire circumferential direction (e.g. above in FIG. 1), and the outboard shoulder lug grooves 20 and the outboard shoulder sipes 23 are curved so as to protrude the other one of the directions in the tire circumferential direction (e.g. below in FIG. 1).

Figure 5:
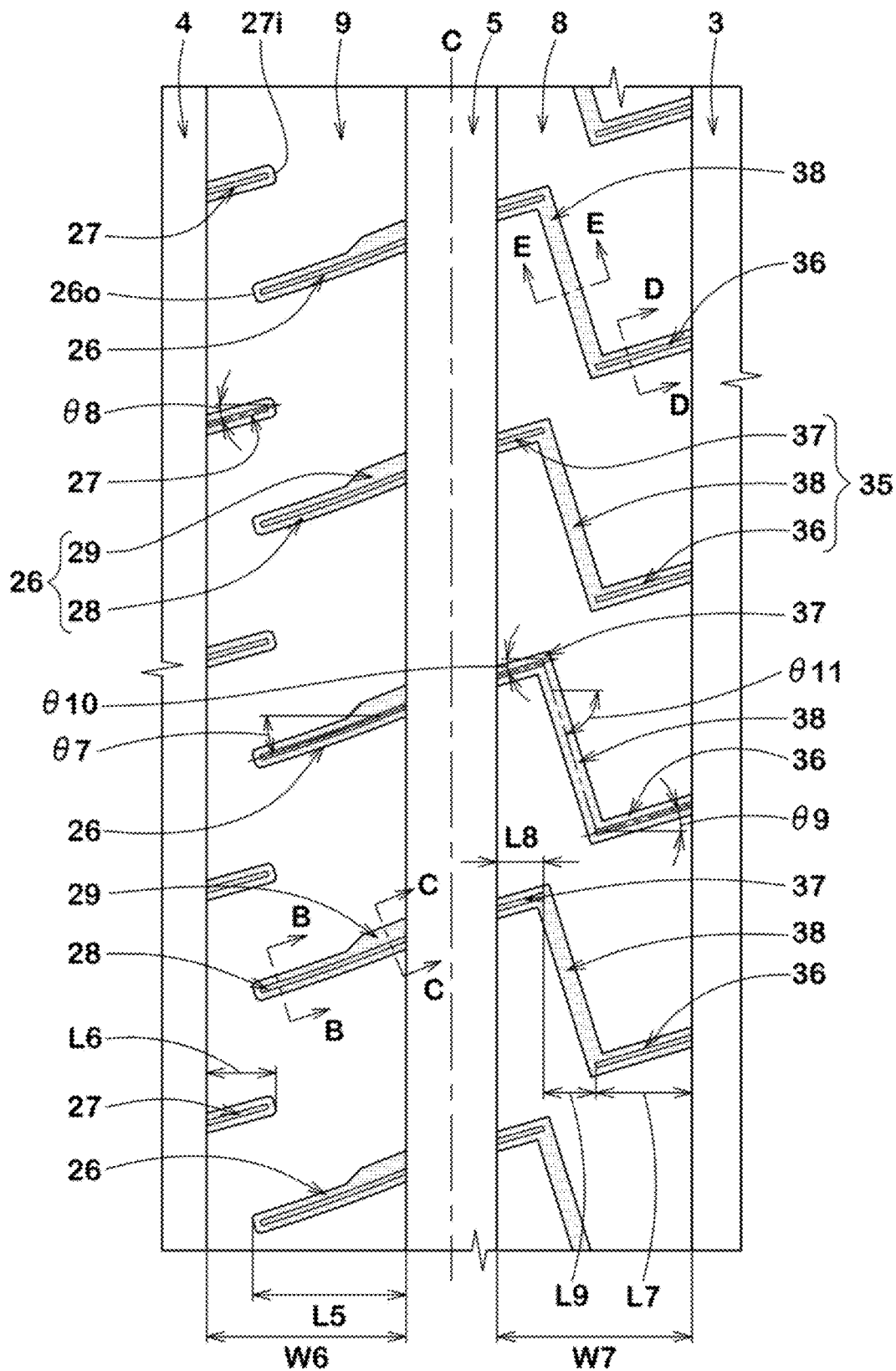
FIG. 5 is an enlarged view of the outboard middle land portion and the inboard middle land portion of FIG. 1.

FIG. 5 illustrates an enlarged view of a middle region of the tread portion 2 including the outboard middle land portion 9 and the inboard middle land portion 8. Note that narrow grooves provided on the outboard middle land portion 9 and the inboard middle land portion 8 are colored in FIG. 5. As illustrated in FIG. 5, the outboard middle land portion 9 is disposed between the outboard shoulder main groove 4 and the crown main groove 5. The inboard middle land portion 8 is disposed between the inboard shoulder main groove 3 and the crown main groove 5. The respective widths W6 and W7 in the tire axial direction of the outboard middle land portion 9 and the inboard middle land portion 8, for example, may preferably be in a range of from 0.10 to 0.20 times the tread width TW.

The outboard middle land portion 9, for example, is not provided with grooves that extend completely across the land portion 9, thereby being formed as a rib that extends continuously in the tire circumferential direction. As this embodiment, a combination of the outboard shoulder lug grooves 20 capable of exhibiting better drainage performance and the outboard middle land portion 9 formed as a rib may improve steering stability and wet performance in a good balance.

In some preferred embodiments, the outboard middle land portion 9, for example, is provided with a plurality of first middle narrow grooves 26 and a plurality of second middle narrow grooves 27. Each of the first middle narrow grooves 26, for example, extends from the crown main groove 5 and terminates within the outboard middle land portion 9. Each of the second middle narrow grooves 27, for example, extends from the outboard shoulder main groove 4 and terminates within the outboard middle land portion 9. These middle narrow grooves 26 and 27 may offer better drainage performance while maintaining rigidity of the outboard middle land portion 9.

The first middle narrow grooves 26, for example, are inclined with respect to the tire axial direction. In some preferred embodiments, the first middle narrow grooves 26 are inclined in the same direction as the second groove portions 12 of the inboard shoulder lug grooves 10 (as illustrated in FIG. 2). The first middle narrow grooves 26 may preferably have angles θ7 in a range of from 15 to 25 degrees with respect to the tire axial direction, for example. The first middle narrow grooves 26 as such, when driving on wet condition, may generate friction force in the tire axial direction due to the groove edges.

In some preferred embodiments, the first middle narrow grooves 26 may have lengths L5 in the tire axial direction in a range of from 0.70 to 0.80 times the width W6 of the outboard middle land portion 9 in the tire axial direction, for example.

In this embodiment, each of the first middle narrow grooves 26 includes a pair of groove edges that include a first edge extends in a straight or smooth curved manner and a second edge being bent in a step manner so as to increase the groove width. Thus, the first middle narrow grooves 26, for example, include outer portions 28 and inner portions 29 located inwardly of the outer portions 28 in the tire axial direction and connected to the crown main groove 5, wherein the inner portions 29 have greater widths, which are measured on the ground contact surface, than widths of the outer portions 28.

Figure 6A:
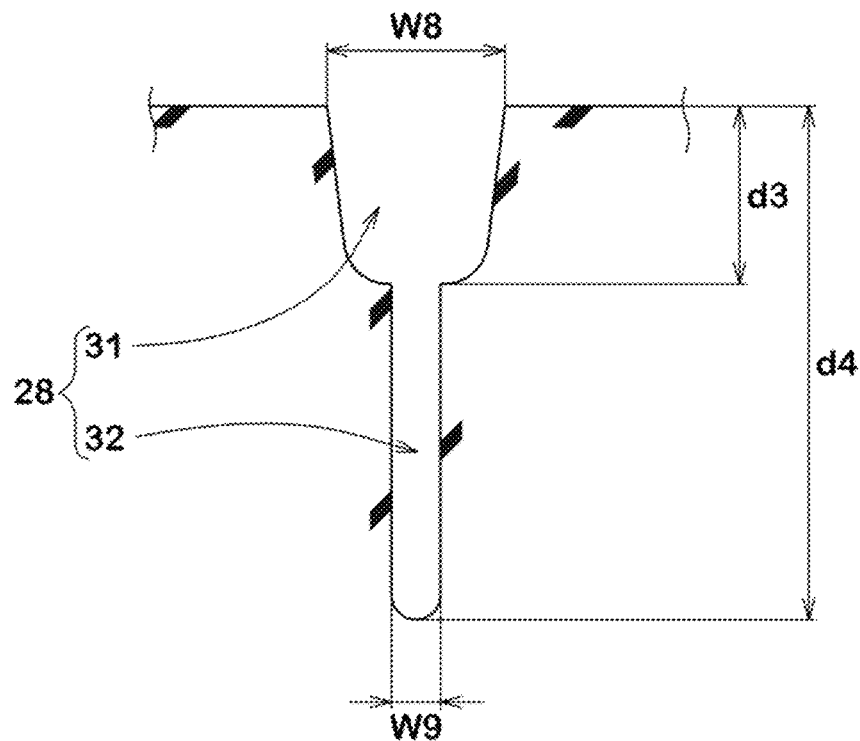
FIGS. 6A and 6B are cross-sectional views taken along the lines B-B and C-C of FIG. 5, respectively.
Figure 6B:
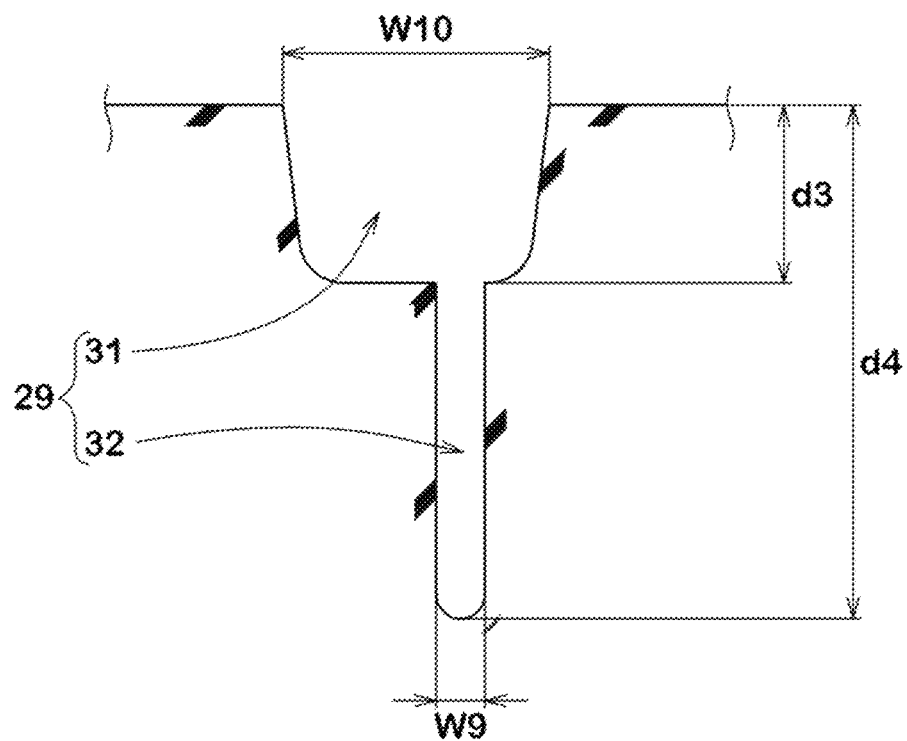

FIG. 6A illustrates a cross-sectional view of one of the outer portions 28 taken along the line B-B of FIG. 5, and FIG. 6B illustrates a cross-sectional view of one of the inner portions 29 taken along the line C-C of FIG. 5. As illustrated in FIGS. 6A and 6B, each of the outer portions 28 and the inner portions 29 includes a broader-width portion 31 formed on the side of the ground contact surface and a sipe portion 32 having a width narrower than that of the broader-width portion 31 and extending inwardly in the tire radial direction from a bottom of the broader-width portion 31. The outer portions 28 and the inner portions 29 may suppress reduction in rigidity of the land portion, leading to better steering stability.

In the outer portions 28, the width W8 of the broader-width portion 31 which is measured on the ground contact surface, for example, is in a range of from 1.5 to 3.0 mm, preferably in a range of from 2.0 to 2.5 mm. The broader-width portion 31 may have a depth d3 in a range of from 1.0 to 2.0 mm, for example. Further, the width W9 of the sipe portion 32, for example, may be in a range of from 0.5 to 1.5 mm. The depth d4 from the ground contact surface to the bottom of the sipe portion 32 may be in a range of from 5.0 to 7.0 mm, for example.

In the inner portions 29, the width W10 of the broader-width portion 31 which is measured on the ground contact surface, for example, is in a range of from 4.0 to 5.5 mm, preferably in a range of from 4.5 to 5.0 mm. The depth d3 of the broader-width portion 31, the width W9 of the sipe portion 32 and the depth d4 from the ground contact surface to the bottom of the sipe portion 32 may preferably be set in the same ranges of the outer portions 28 as described above. The first middle narrow grooves 26 with the inner portions 29 may be useful to make up for drainage of the crown main groove 5.

As illustrated in FIG. 5, the second middle narrow grooves 27, for example, are inclined at angles θ8 with respect to the tire axial direction. In this embodiment, the second middle narrow grooves 27, for example, are inclined in the same direction as the first middle narrow grooves 26. In some preferred embodiments, the angles θ8 of the second middle narrow grooves 26 may be in a range of from 15 to 25 degrees with respect to the tire axial direction, for example. The second middle narrow grooves 27 as such may generate friction force parallel to the tire axial direction in the contact patch.

In some preferred embodiments, the lengths L6 in the tire axial direction of the first middle narrow grooves 26 are greater than the lengths L5 in the tire axial direction of the second middle narrow grooves 27. Specifically, the lengths L6, for example, are preferably in a range of from 0.30 to 0.40 times the width W6 of the outboard middle land portion 9. In some preferred embodiments, the inner ends 27i of second middle narrow grooves 27 in the tire axial direction are located inwardly in the tire axial direction of the outer ends 26o of the first middle narrow grooves 26 in the tire axial direction. The second middle narrow grooves 27 as such may be useful to suppress uneven wear of an outer portion of the outboard middle land portion 9 in the tire axial direction.

As illustrated in FIG. 1, in some preferred embodiments, the second middle narrow grooves 27 are arranged in such a manner as to be smoothly continuous to the outboard shoulder lug grooves 20 through the outboard shoulder main groove 4. Note that "one groove to be smoothly continuous to the other groove through a main groove" means an aspect where an extended groove area of the one groove to the other one groove along its shape overlaps with an opening at the main groove of the other one groove. The arrangement of the grooves as described above, when driving on wet road conditions, may drain out the water in the outboard shoulder lug grooves 20 and the second middle narrow grooves 27 together with the water in the outboard shoulder main groove 4 effectively, and which may offer better drainage performance than the aspect where the outboard shoulder lug grooves 20 and the second middle narrow grooves 27 are arranged in such a manner as to be shifted in the tire circumferential direction.

In some preferred embodiments, each of the second middle narrow grooves 27, for example, has the cross-sections which is configured to substantially the same shape as the outer portions 28 of the first middle narrow grooves 26, as illustrated in FIG. 6A. Further, regarding the dimensions of second middle narrow grooves 27, the ranges of dimensions of the outer portions 28 as described above may be employed, for example.

As illustrated in FIG. 5, in some preferred embodiments, the inboard middle land portion 8, for example, may be provided with a plurality of inboard middle narrow grooves 35 that extend completely across the inboard middle land portion 8.

In some preferred embodiments, the inboard middle narrow grooves 35, for example, may be bent in a Z-shaped manner. More specifically, each of the inboard middle narrow grooves 35 includes a first portion 36 extending from the inboard shoulder main groove 3 with an inclination with respect to the tire axial direction, a second portion 37 extending from the crown main groove 5 with the same inclination direction as the first portion 36 and a third portion 38 disposed between the first portion 36 and the second portion 37.

The first portion 36 and the second portion 37 may be preferably inclined in the same direction as the second groove portions 12 of the inboard shoulder lug grooves 10. In this embodiment, the first portion 36 and the second portion 37 are arranged in parallel with each other. The angles θ9 and θ10 of the first portion 36 and the second portion 37 respectively may preferably be in a range of from 10 to 20 degrees with respect to the tire axial direction.

The length L7 in the tire axial direction of the first portion 36, for example, may preferably be in a range of from 0.45 to 0.55 times the width W7 of the inboard middle land portion 8 in the tire axial direction. The length L8 in the tire axial direction of the second portion 37, for example, may preferably be smaller than the length L7 of the first portion 36 in the tire axial direction. Specifically, the length L8 of the second portion 37, for example, may preferably be in a range of from 0.25 to 0.35 times the width W7 of the inboard middle land portion 8. The first portion 36 and the second portion 37 may enhance an axially inner region of the inboard middle land portion 8 in rigidity, leading to better steering stability while suppressing uneven wear of the land portion 8.

As illustrated in FIG. 1, in some preferred embodiments, each first portion 36 may extend in such a manner as to be smoothly continuous to each inboard shoulder sipe 15 through the inboard shoulder main groove 3. In some preferred embodiments, each second portion 37 may extend in such a manner as to be smoothly continuous to each first middle narrow groove 26 through the crown main groove 5.

The groove arrangement as such may be useful to further improve drainage performance.

Figure 7A:
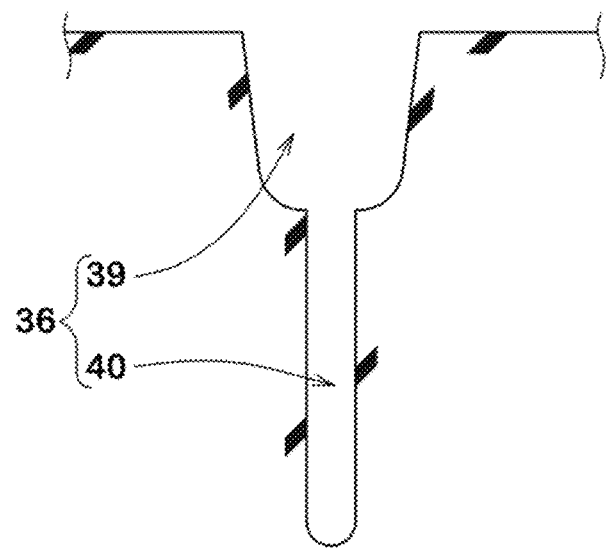
FIGS. 7A and 7B are cross-sectional views taken along the lines D-D and E-E of FIG. 5, respectively.

FIG. 7A illustrates a cross-sectional view of one of the first portions 36 taken along the line D-D of FIG. 5 as a cross-sectional view of the first portion 36 and the second portion 37. As illustrated in FIG. 7A, each of the first portion 36 and the second portion 37, in the cross-sectional view, includes a broader-width portion 39 formed on the side of the ground contact surface and a sipe portion 40 having a width narrower than that of the broader-width portion 39 and extending inwardly in the tire radial direction from a bottom of the broader-width portion 39. Note that specific dimensions of the broader-width portion 39 and the sipe portion 40 may be set in the same manner as the broader-width portion 31 and the sipe portion 32 (as illustrated in FIG. 6A) of the outer portions 28 of the first middle narrow grooves 26, which were described above.

As illustrated in FIG. 5, each third portion 38, for example, is inclined in an opposite direction to each first portion 36 and each second portion 37. The angle θ11 of each third portion 38 with respect to the tire axial direction, for example, may preferably be greater than the angle θ9 of each first portion 36 and the angle θ10 of each second portion 37, and specifically may preferably be in a range of from 70 to 80 degrees.

The length L9 in the tire axial direction of each third portion 38, for example, may be smaller than the length L7 of each first portion 36 but greater than the length L8 of each second portion 37. The length L9 of each third portion 38, for example, may be in a range of from 0.25 to 0.35 times the width W7 in the tire axial direction of the inboard middle land portion 8.

Figure 7B:
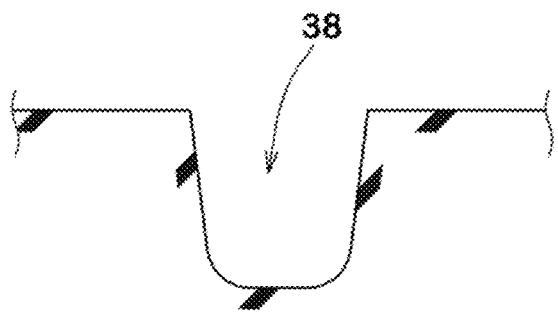

FIG. 7B illustrates a cross-sectional view of one of the third portion 38 taken along the line E-E of FIG. 5. As illustrated in FIG. 7B, the third portion 38 is not provided with the sipe portion as provided on the first portion 36 and the second portion 37. The maximum depth of the third portion 38, for example, is substantially the same depth as the depth of the broader-width portion 39 of the first portion 36 and the second portion 37 (as illustrated in FIG. 6A).

The third portion 38 may improve cornering performance on wet driving condition due to its groove edges. Further, since the third portion 38 is not provided with the sipe portion, rigidity in the tire axial direction of the middle region of inboard middle land portion 8 may be maintained, leading to better steering stability.

While the particularly preferable embodiments in accordance with the present disclosure have been described in detail, the present invention is not limited to the illustrated embodiments, but can be modified and carried out in various aspects.

EXAMPLE

Pneumatic tires 205/55R16 having the basic tread pattern as illustrated in FIG. 1 were manufactured based on the details as shown in Table 1. A reference example tire was also manufactured as illustrated in FIG. 8. The reference example tire includes a tread portion which is provided with a plurality of lug grooves on the outboard shoulder land portion, and the plurality of lug grooves was terminated within the outboard shoulder land portion. Then steering stability and wet performance of each test tire was tested. The common specification of the tires and test procedures are as follows.
Rim: 16×6.5 JJ
Tire inner pressure: 230 kPa
Test vehicle: front wheel drive car with displacement of 2000 cc
Tire locations: all wheels
Steering Stability Test:
A test driver drove the test vehicle equipped with the test tires on an asphalt test road to evaluate the steering stability based on his sense. The test results are shown in Table 1 using a score wherein the Ref is set to 100. The larger the score, the better the steering stability is.
Wet Performance Test:
The above test vehicle was run on a wet asphalt road provided with a 5 millimeter depth 20 meter long water pool along a 100 meter radius circle, and the lateral acceleration (lateral-G) when entered into the water pool was measured to obtain the average lateral-G in a speed range of from 50 to 80 km/hr. The test results are indicated in Table 1 by an index based on Ref. being 100. The larger the index, the better the wet performance is.

Table 1 shows the test results. As apparent from the test results as shown in Table 1, it was confirmed that the example tires delivered excellent steering stability and wet performance as compared with the reference example tire.

TABLE 1

|  | Ref. | Ex. 1 | Ex. 2 | Ex. 3 | Ex. 4 | Ex. 5 | Ex. 6 | Ex. 7 |
|---|---|---|---|---|---|---|---|---|
| Tread pattern | FIG. 8 | FIG. 1 | FIG. 1 | FIG. 1 | FIG. 1 | FIG. 1 | FIG. 1 | FIG. 1 |
| Inboard shoulder main groove width W1/tread width TW (%) | 8.4 | 8.4 | 7.4 | 9.4 | 8.4 | 8.4 | 8.4 | 8.4 |
| Outboard shoulder main groove width W2/tread width TW (%) | 7.2 | 7.2 | 7.2 | 7.2 | 6.2 | 8.2 | 7.2 | 7.2 |
| Inboard shoulder lug groove lengths L1/inboard shoulder land portion width W4 | 0.80 | 0.80 | 0.80 | 0.80 | 0.80 | 0.80 | 0.75 | 0.85 |
| Steering stability (score) | 100 | 103 | 105 | 101 | 105 | 102 | 104 | 102 |
| Wet performance (index) | 100 | 106 | 104 | 107 | 103 | 107 | 104 | 106 |

What is claimed is:

1. A tire comprising:
a tread portion having a designated install direction to a vehicle so as to have an inboard tread edge which is intended to be positioned toward the center of a vehicle body of a vehicle when the tire is installed to the vehicle and an outboard tread edge which is intended to be positioned away from the center of the vehicle body when the tire is installed to the vehicle;
the tread portion being provided with
an inboard shoulder main groove extending continuously in a tire circumferential direction on the side of the inboard tread edge to form an inboard shoulder land portion between the inboard tread edge and the inboard shoulder main groove, an outboard shoulder main groove extending continuously in the tire circumferential direction on the side of the outboard tread edge with a width smaller than a width of the inboard shoulder main groove to form an outboard shoulder land portion between the outboard tread edge and the outboard shoulder main groove, and an inboard middle land portion adjacent to the inboard shoulder land portion through the inboard shoulder main groove;

the inboard shoulder land portion being provided with a plurality of inboard shoulder lug grooves each extending inwardly in a tire axial direction from at least the inboard tread edge and terminated within the inboard shoulder land portion;

the outboard shoulder land portion being provided with a plurality of outboard shoulder lug grooves each extending inwardly in the tire axial direction from at least the outboard tread edge to the outboard shoulder main groove; and the inboard middle land portion being provided with a plurality of inboard middle narrow grooves extending completely across the inboard middle land portion, wherein each of the plurality of inboard middle narrow grooves comprises:

a first portion extending from the inboard shoulder main groove and inclined in a first direction with respect to the tire axial direction;

a second portion extending from a crown main groove and inclined in the first direction with respect to the tire axial direction; and a third portion arranged between the first portion and the second portion and inclined in a second direction opposite the first direction with respect to the tire axial direction, a length in the tire axial direction of the third portion is smaller than a length in the tire axial direction of the first portion but greater than a length in the tire axial direction of the second portion, the length in the tire axial direction of the first portion is in a range of from 0.45 to 0.55 times a width of the inboard middle land portion in the tire axial direction, the length in the tire axial direction of the second portion is in a range of from 0.25 to 0.35 times the width of the inboard middle land portion, the tread portion is further provided with the crown main groove extending continuously in the tire circumferential direction between the inboard shoulder main groove and the outboard shoulder main groove, the crown main groove has a width smaller than the width of the inboard shoulder main groove and larger than the width of the outboard shoulder main groove, the tread portion comprises an outboard middle land portion between the outboard shoulder main groove and the crown main groove, the outboard middle land portion is provided with a plurality of first middle narrow grooves extending from the crown main groove and terminated within the outboard middle land portion and a plurality of second middle narrow grooves extending from the outboard shoulder main groove and terminated within the outboard middle land portion, lengths in the tire axial direction of the plurality of second middle narrow grooves are shorter than lengths in the tire axial direction of the plurality of first middle narrow grooves, the plurality of first middle narrow grooves each comprises a pair of groove edges that comprise a first edge extends in a straight or smooth curved manner and a second edge being bent in a step manner so as to increase a groove width of the first middle narrow groove, thereby each first middle narrow groove comprising an outer portion, and an inner portion located inwardly of the outer portion in the tire axial direction and connected to the crown main groove, wherein the inner portion have a greater width than a width of the outer portion, each of the outer portion and the inner portion comprises a broader-width portion formed on the side of a ground contact surface and a sipe portion having a width narrower than that of the broader-width portion and extending inwardly in the tire radial direction from a bottom of the broader-width portion, the sipe portion of the outer portion extends on a groove centerline of the broader-width portion of the outer portion, and the sipe portion of the inner portion extends on a location offset from a groove centerline of the broader-width portion the inner portion.

2. The tire according to claim 1,
wherein each of the plurality of outboard shoulder lug grooves comprises a shallow bottom portion on an inner end portion thereof in the tire axial direction.

3. The tire according to claim 1,
wherein the plurality of second middle narrow grooves extends so as to be continuous smoothly to the plurality of outboard shoulder lug grooves through the outboard shoulder main groove.

4. The tire according to claim 1, wherein
each of the first portion and the second portion comprises a broader-width portion formed on the side of the ground contact surface of the inboard middle land portion and a sipe portion having a width narrower than that of the broader-width portion of each of the first portion and the second portion, and extending inwardly in the tire radial direction from a bottom of the broader-width portion of each of the first portion and the second portion.

5. The tire according to claim 4,
wherein the third portion has a maximum depth which is same as a maximum depth of the broader-width portion of the first portion and a maximum depth of the broader-width portion of the second portion.

6. The tire according to claim 1,
wherein the second portion extends so as to be continuous smoothly to one of the plurality of first middle narrow grooves through the crown main groove.

7. The tire according to claim 1,
wherein an angle of the first portion and an angle of the second portion are in a range from 10 to 20 degrees with respect to the tire axial direction, and
wherein an angle of the third portion is in a range from 70 to 80 degrees with respect to the tire axial direction.

8. The tire according to claim 1,
wherein the inboard middle land portion is provided with only the plurality of inboard middle narrow grooves.

9. The tire according to claim 1, wherein
the inboard shoulder land portion is provided with a plurality of inboard shoulder sipes extending completely across the inboard shoulder land portion in the tire axial direction.

10. The tire according to claim 9, wherein
each of the inboard shoulder sipes comprises
  a first sipe portion extending at an angle equal to or less than 5 degrees with respect to the tire axial direction and located on the inboard tread edge side, and
  a second sipe portion connected to the first sipe portion and inclined at an angle of from 15 to 25 degrees with respect to the tire axial direction.

11. The tire according to claim 1, wherein
each of the inboard shoulder lug grooves comprises
  a first groove portion extending at an angle within 5 degrees with respect to the tire axial direction and a second groove portion connected to the first groove portion,
  the second groove portion extends such that a bent portion is formed between the first groove portion and the second groove portion, and
  an angle of the second groove portion is in a range from 10 to 20 degrees with respect to the tire axial direction.

12. The tire according to claim 9, wherein
each first portion extends in such a manner as to be smoothly continuous to a respective one of the inboard shoulder sipes through the inboard shoulder main groove.

13. The tire according to claim 11, wherein
the inboard shoulder land portion is provided with a plurality of inboard shoulder sipes extending completely across the inboard shoulder land portion in the tire axial direction,
the inboard shoulder sipes comprise first sipe portions extending at angles equal to or less than 5 degrees with respect to the tire axial direction and located on the side of the inboard tread edge, and second sipe portions connected to the first sipe portions at different angles with respect to the first sipe portions in such a way as to form bent portions therebetween, and
each first groove portion has a length in the tire axial direction being greater than a distance from the inboard tread edge to the respective bent portions.

14. The tire according to claim 13, wherein
the length of each first groove portion is in a range of from 0.50 to 0.60 times a width of the inboard shoulder land portion in the tire axial direction, and
the distance is in a range of from 0.40 to 0.50 times the width of the inboard shoulder land portion.

* * * * *